UNITED STATES PATENT OFFICE.

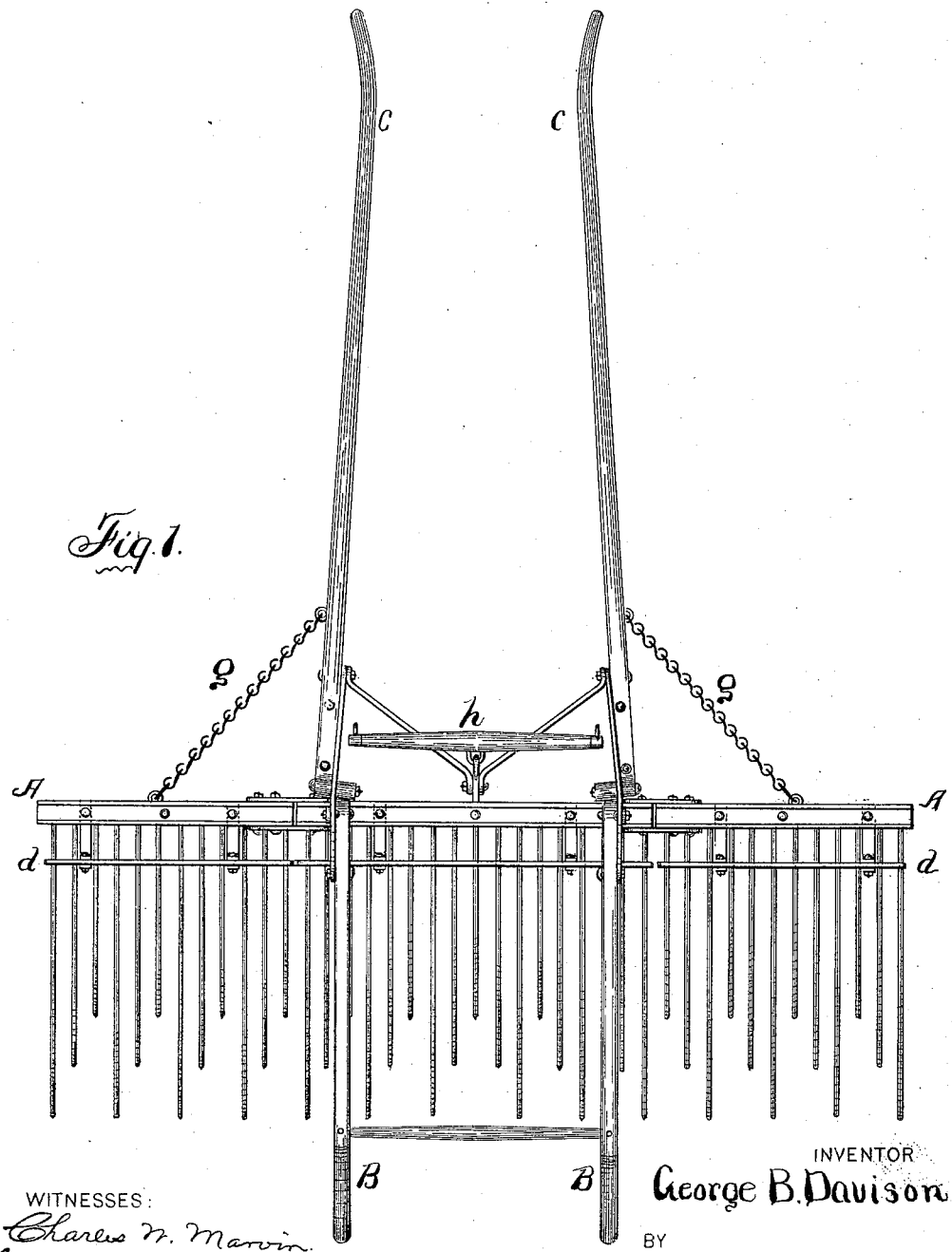

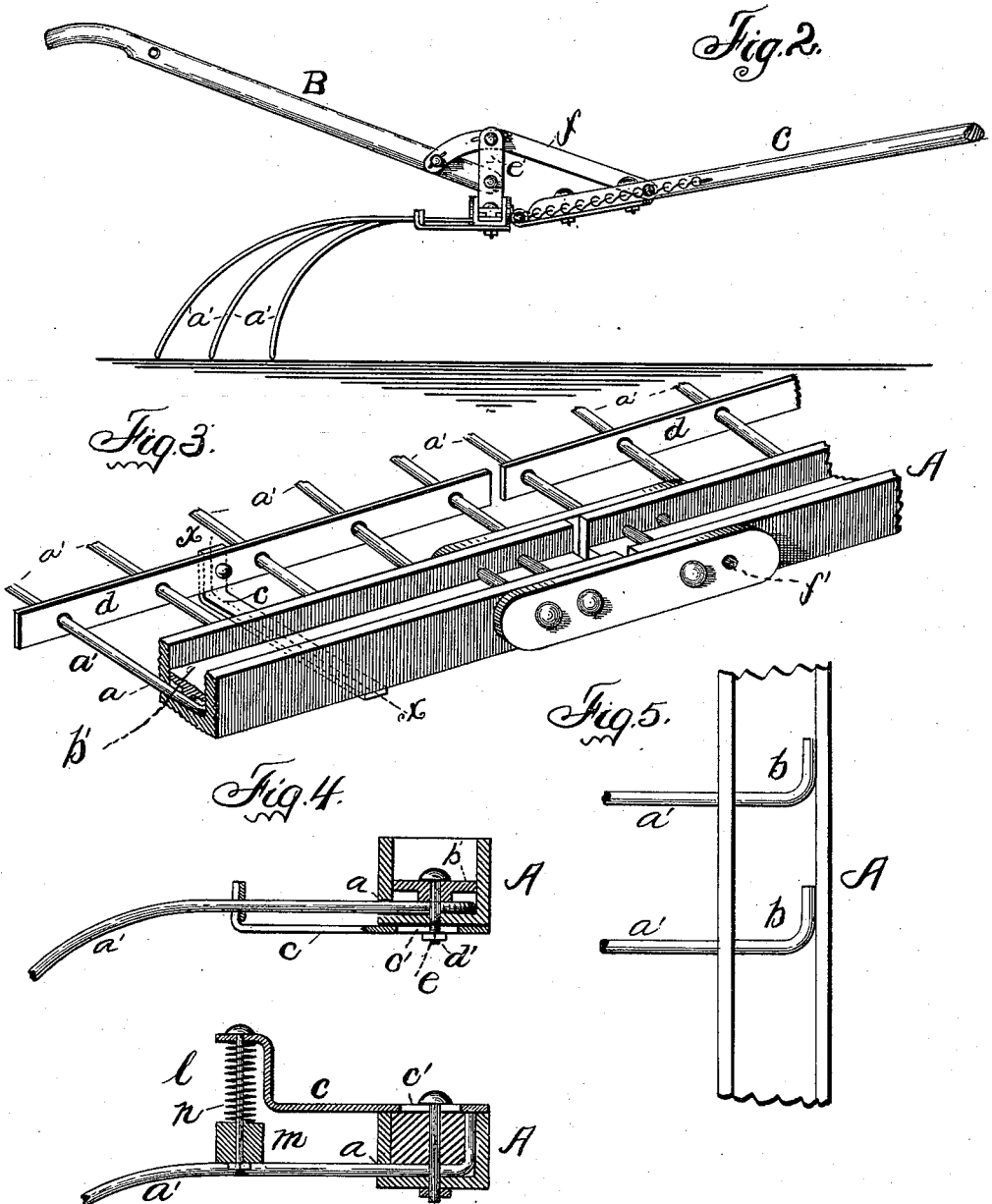

GEORGE BENNETT DAVISON, OF UTICA, NEW YORK, ASSIGNOR TO THE EUREKA MOWER CO., OF SAME PLACE.

WEEDER.

SPECIFICATION forming part of Letters Patent No. 601,504, dated March 29, 1898.

Application filed October 15, 1897. Serial No. 655,317. (No model.)

*To all whom it may concern:*

Be it known that I, GEORGE BENNETT DAVISON, of Utica, in the county of Oneida, in the State of New York, have invented new and useful Improvements in Weeders, of which the following, taken in connection with the accompanying drawings, is a full, clear, and exact description.

This invention relates to improvements in agricultural implements, having particular reference to that class known as "weeders."

My object is to provide an implement which will take out the surface weeds and allow the plant or vegetable which has been planted to receive all of the strength and nourishment of the soil, and at the same time preventing its interference with the young roots of the plant.

My further object is to provide an implement which may be passed over the planted ground and loosen it up after a long and protracted rain, so as to lessen materially the capillary attraction by which the moisture is drawn from the ground; and to that end my invention consists in the several new and novel features of construction and operation hereinafter described, and which are specifically set forth in the claims hereunto annexed.

It is constructed as follows, reference being had to the accompanying drawings, in which—

Figure 1 is a top plan view of the weeder complete ready for use. Fig. 2 is a side view thereof. Fig. 3 is an enlarged section of part of the channel-iron and teeth of the weeder, showing how the wings are hinged or rigidly secured to the body. Fig. 4 is a cross-section on line $x$ $x$, Fig. 3. Fig. 5 is a top plan view of a portion of the channel-iron in which the teeth are secured. Fig. 6 is a cross-section of a modified form of the tension for the teeth.

A is a channel-iron having openings in one edge, as shown at $a$, to receive the spring-teeth $a'$ of the weeder, which are secured in the channel-iron A in any ordinary and well-known manner. I prefer, however, to turn the ends over, as shown at $b$ in Fig. 5, and then secure over them the bar $b'$, either by bolting the bar, as shown in Fig. 4, or in any other well-known manner.

The teeth $a'$ are ordinary rake-teeth, and I preferably make them long and short, as shown in Figs. 1 and 2, so as to produce a varied tension, the shorter teeth being adapted to pass down into the ground and loosen the dirt and draw the weeds to the surface, while the longer ones pass along and gather them up.

In the channel-iron A, I adjustably mount a rearwardly and upwardly extending arm $c$, adapted to hold the cross-bar $d$, the said bar being perforated and adapted to receive the teeth, as shown, and by which the tension of the teeth may be adjusted. The arm $c$ may contain an elongated slotway $c'$, so that it may be adjusted by releasing the nut $d'$ upon the bolt $e$. I do not, however, limit myself to this construction or method of adjustment, as it will be evident that it may be done in many other ways.

Upon the channel-iron A, I erect standards $e'$, to which I hinge the handles B, and $f$ is a strap connecting the thills C, the upper end of the upright $e'$, and the handles together, the said strap being provided with slotways, so as to admit of adjustment of the handles.

The weeder is preferably constructed with wings or flies, so as to allow either end to be raised, so as to pass readily over a stone or any other obstruction. This I do, preferably, by making the channel-iron A in three pieces, as shown in Fig. 1, and providing means for either hinging them together or securing them rigidly together, as shown in Fig. 3.

It will be observed by referring to Fig. 3 that the two parts are hinged together, and it will also be observed that by placing the fourth bolt in the opening $f'$ shown the two parts will be rigidly hinged together.

It will be observed that by passing the teeth through the bar $d$ I give them support against lateral or torsional displacement.

In Fig. 6 I show a modified form of tension for the teeth. The arm $c$ is mounted upon the channel-iron and provided with a slotway $c'$ for longitudinal adjustment. $l$ is a bolt holding a cross-bar $m$ in engagement with the teeth, and $n$ is a coil-spring mounted on said bolt between said bar and the end of the arm $c$ and serves to impart additional tension to the teeth.

To relieve the ends or flies from lateral strain, I connect them to the thills by flexible connections $g$, and $h$ is a whiffletree suitably mounted and connected in any ordinary manner.

It will be observed that this weeder may be put onto a piece of corn or potatoes even after the crop is up several inches and the surface weeds removed, while the teeth will not drop down deep enough to interfere in any way with the roots of the plant.

Having described my invention, what I claim, and desire to secure by Letters Patent, is—

1. A weeder comprising a channel-iron beam having openings in one flange thereof, curved teeth inserted in said openings, and having their upper ends bent and adapted to rest in the channel of the beam, a follower-bar arranged over the teeth and adapted to clamp them to the beam, a perforated cross-bar in rear of the beam through which the teeth pass, a bar connecting said cross-bar and beam and draft devices attached to the weeder.

2. A sectional weeder comprising channel-iron beams, tension-bars adjustably secured in rear of the beams, curved teeth inserted through said bars and into said beams, follower-bars clamping the teeth in the channels of the beams, chains secured to the outer sections and attached to thills and adjustable handles for manipulating the implement.

In witness whereof I have hereunto set my hand this 1st day of September, 1897.

GEORGE BENNETT DAVISON.

In presence of—
FRED GIBSON,
O. J. CHILDS.